United States Patent [19]
Murphy

[11] 3,720,045
[45] March 13, 1973

[54] DYNAMIC BLADE PARTICLE SEPARATOR
[75] Inventor: Joseph P. Murphy, Newtown, Conn.
[73] Assignee: Avco Corporation, Stratford, Conn.
[22] Filed: Nov. 16, 1970
[21] Appl. No.: 89,733

[52] U.S. Cl. ............55/306, 55/407, 60/39.09 P, 415/121, 415/168
[51] Int. Cl. ..............................................B01d 45/12
[58] Field of Search...............55/306, 400–409; 415/168, 121 A; 60/39.09 P; 244/53 B

[56] References Cited
UNITED STATES PATENTS

| | | | |
|---|---|---|---|
| 2,780,309 | 2/1957 | Loftheim | 55/407 |
| 2,991,844 | 7/1961 | Nomar | 55/403 |
| 3,039,736 | 6/1962 | Pon | 415/DIG. 1 |
| 3,444,672 | 5/1969 | Alsobrooks | 55/306 |
| 3,557,537 | 1/1971 | Roberts | 55/306 |

FOREIGN PATENTS OR APPLICATIONS 316,381    8/1929    Great Britain.................415/168

OTHER PUBLICATIONS

German printed patent application 1026916 dated 3/58 1 sht dwg. – 1 sht spec.

Primary Examiner—Bernard Nozick
Attorney—Charles M. Hogan and Eugene C. Goodale

[57] ABSTRACT

A dynamic rotor blade particle separator for separating and removing foreign particles from the engine inlet air is disclosed. The dynamic separator utilizes a rotating set of blades, each with a radial slot and catching lip on the pressure side of the blade. The foreign particles are caught by the lip, subjected to the centrifugal force field of the blades and centrifuged to an outer collection chamber for ejection.

1 Claim, 3 Drawing Figures

PATENTED MAR 13 1973 3,720,045
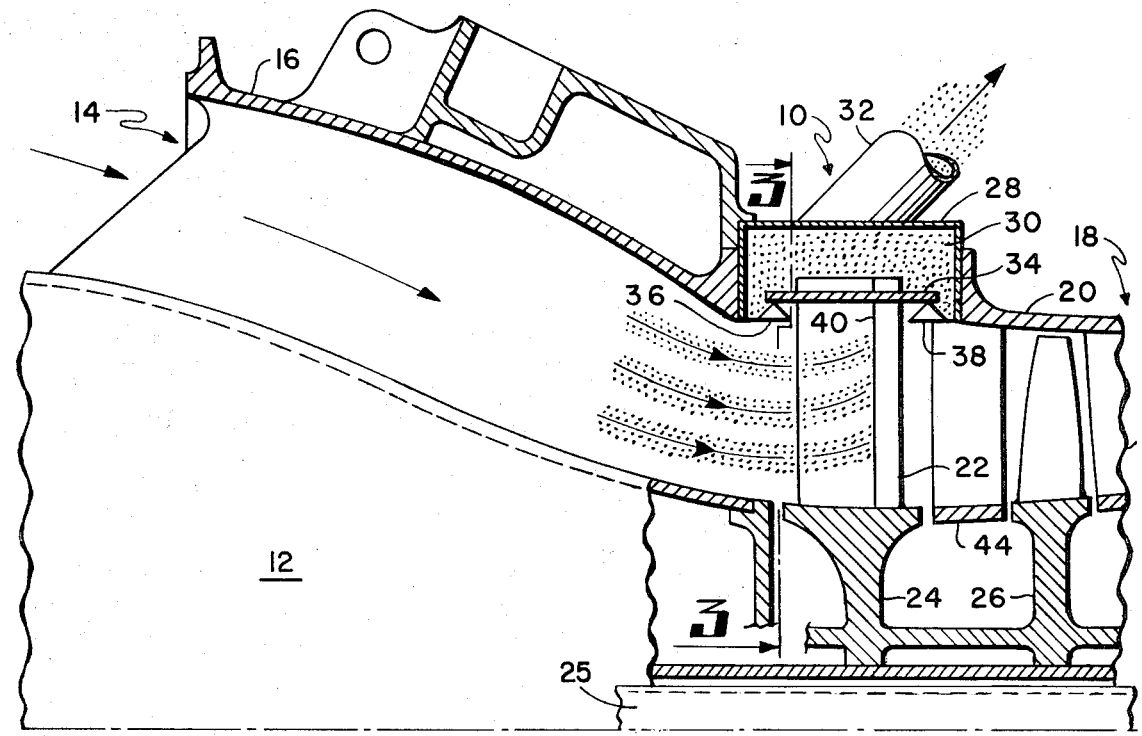
Fig. 1
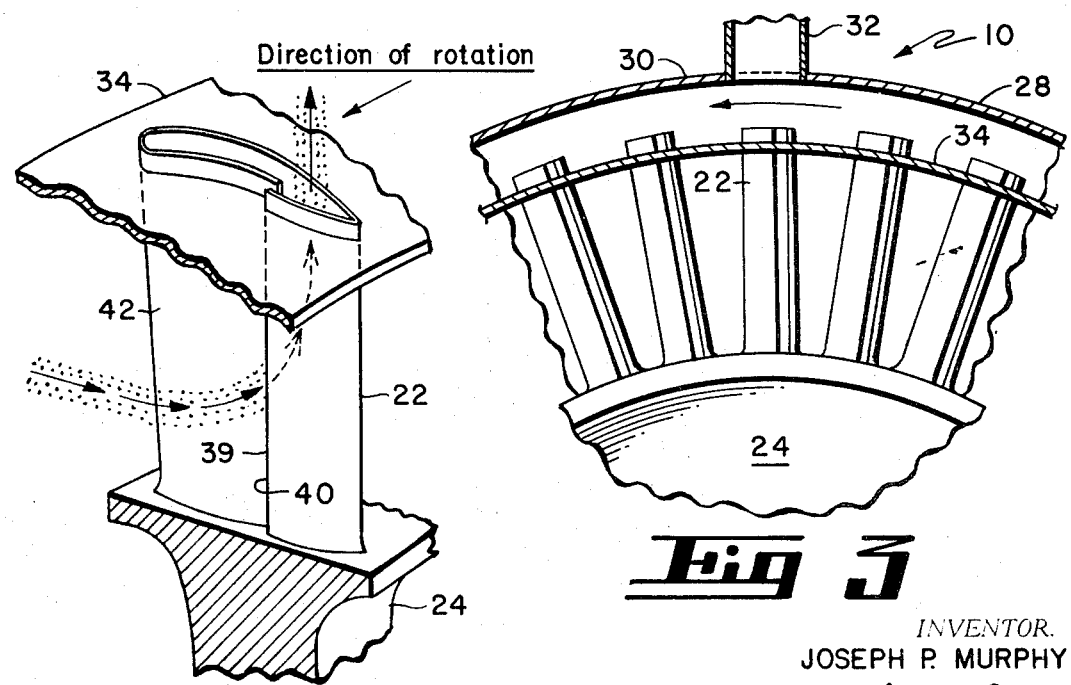
Fig. 2
Fig. 3
INVENTOR.
JOSEPH P. MURPHY
BY Charles M. Hogan
Eugene C. [illegible]
ATTORNEYS.

3,720,045

DYNAMIC BLADE PARTICLE SEPARATOR

BACKGROUND OF THE INVENTION

This invention relates to air intakes, particularly intakes for gas turbines or air compressors which are required to operate in sand or dust laden air, and more particularly to a dynamic particle separator incorporated in said air intake.

The use of turbine-powered helicopters in severe sand laden atmospheric conditions has resulted in a dramatic increase in cases of engine erosion damage and has underscored the need for effective systems to protect gas turbine engines from sand and dust ingestion. Solutions to these problems have yielded a wide variety of particle separator concepts which are generally appended to the engine installation. Examples of such separators are shown in U.S. Pat. Nos. 3,371,471 and 3,534,548, both issued to H. D. Connors and assigned to Avco Corp.

The increased engine protection afforded by these units has more than justified their use. However, physical limitations imposed by this add-on approach sometimes result in the aircraft system suffering from lower sand collection efficiencies, higher weight, and larger losses in power than may be necessary. These problems can be significantly reduced by providing a particle separator which is incorporated within the engine air inlet.

Accordingly, it is an object of this invention to provide a dynamic separator which is integral with the engine.

A further object of this invention is to provide a dynamic particle separator in a low loss system wherein the separator can be used to supercharge the compressor.

Yet another object of this invention is to provide a particle separator which has high operating efficiency on small sized particles, the separator having optimized geometry.

A still further object of this invention is to provide a dynamic particle separator having high scavenging efficiency due to centrifugal effects.

SUMMARY OF THE INVENTION

This invention provides an improved particle separator for removing foreign particles from the stream of air supplied to the compressor of an engine. The separator is a dynamic system which utilizes a plurality of rotating blades driven by the engine shaft. Each blade is formed with radial slot and catching lip on the pressure or driven side of the blade. Entrained particles are caught by this lip, ducted inside the blade where they are subjected to the blade's centrifugal force field and centrifuged to an outer collection chamber for ejection overboard.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a side view, partially cut away, through part of the air intake of a gas turbine engine which is provided with the dynamic separator system according to the present invention;

FIG. 2 is a perspective view of one of the blades of the separator system; and

FIG. 3 is a view taken along line 3—3 of FIG. 1.

DESCRIPTION OF THE ILLUSTRATIVE EMBODIMENT

Reference is now made to FIG. 1 which illustrates one exemplary embodiment of the improved contaminant separator of this invention, which is designated generally by the reference numeral 10. The separator 10 is mounted at the forward end of the turbine engine just ahead of the compressor stage 18. The annular gear housing 12 forms the inner wall of the engine air inlet duct 14. The outer wall of the duct 14 is defined by the annular inlet housing 16.

The dynamic particle separator 10 is mounted downstream of the air inlet duct 14 entrance and before the first compressor stage 18 defined by the axial compressor casing 20. The separator 10 comprises a plurality of rotatable blades 22 which are mounted for rotation about the annular air duct 14. Each of the rotatable blades 22 is mounted on a rotor 24. The rotor and blade assembly is driven through any suitable reduction gearing (not shown) by the engine shaft 25. The engine shaft likewise drives the compressor rotor blades 26.

A wall 28 defines the outer surface of an annular collection chamber 30 for receiving particles in a manner to be described below. Suitable means, such as an exhaust tube 32, is connected to the collection chamber wall 28 so as to provide communication between the collection chamber 30 and the external atmosphere. An annular shroud 34 is secured near the outer end of the blades 22. Suitable seals 36 and 38 provide a seat for the shroud 34 wherein during rotation of the blades 22 and shroud 34, an airtight seal exists between the shroud and the seals 36 and 38 to prevent escape of any particles in the collection chamber 30 into the air duct 14.

Referring now to FIG. 2, it is seen that each blade 22 is formed with a radially extending slot 39 defined by a catching lip 40 on the pressure or driven side 42 of the blade.

During operation of the engine, air enters the air inlet duct 14 and proceeds to the dynamic particle separator 10. As the blades 22 are rotatably driven, the geometry of the plurality of such blades in such that entrained particles in the air stream are caught by the catching lip 40 and ducted inside the blade 22 which may be hollow. The particles inside the blade are subjected to the blade's centrifugal force field due to the rotation thereof so that the particles are centrifuged outward into the collection chamber 30. The particles from the collection chamber 30 may then be ejected by any suitable means at any suitable time. The rotating action of the blades 22 will impart a swirl to the clean air which passes through the separator 10 on its way to the compressor. Deswirl vanes 44 are mounted ahead of the compressor stage to correct the airflow.

While the dynamic particle separator has been herein shown with a cambered blade, the blade could just as well be an uncambered blade. It is only necessary that the blade angle, circumferential velocity, and solidity are set so that the blades rotate through one blade position in less than the particle residence time within the blade passage area.

Because of the unique dynamic structural features of the particle separator of this invention, it is seen that there is no need for extraneous add-on structures to be placed on the engine. The particle separator is inserted in the air duct upstream of the first compressor stage and is driven through suitable gearing from the engine shaft. This structure may also provide supercharging for the engine compressor. Accordingly, it can be seen that this invention accomplishes the objectives hereinabove set forth.

While a present exemplary embodiment of this invention has been illustrated and described it will be recognized that this invention may be otherwise variously embodied and practiced by those skilled in the art.

What is claimed is:

1. In a gas turbine engine assembly including a compressor stage having an axial flow inlet thereto, a rotatable drive shaft to drive the compressor blades, a dynamic particle separator stage driven by the engine shaft for removing contaminant particles from the axial stream flow of air supplied to the compressor inlet, said particle separator comprising:

an annular housing assembly mounted ahead of the compressor inlet, the assembly outer wall and inner wall defining an annular air intake passageway to provide an axial flow path to the compressor stage;

a rotor downstream of said intake passageway and journaled coaxially with the engine drive shaft and driven thereby, the axis of said rotor being coaxial with the flow path in the intake passageway, said rotor having an outer diameter the same as the inner wall of said intake passageway to define the inner wall of the axial flow path thereabout;

a plurality of radially extending particle separator blades mounted on said rotor for movement in a transverse plane in the axial flow path through the annular inlet passageway, each blade extending radially across the axial flow path at least the radial length of the intake passageway, each of said blades being formed with a radial passage within the blade;

each separator blade having a radially extending slot formed on the pressure side of said blade and a radially extending catching lip on the pressure side defining one edge of said slot, said slot opening into the blade radial passage wherein transverse movement of said blades through the axial flow path of said inlet passageway entraps particles by said catching lip and slot whereby the particles are centrifuged radially outwardly within the blade radial passage due to centrifugal force;

a particle collecting chamber externally of the particle separator stage, said collecting chamber being in communication with the ends of each of said particle blades wherein particles are centrifuged radially outwardly from said blades into said particle collecting chamber;

an annular shroud carried by said blades and mounted adjacent the outer end of said separator blades, said shroud forming a rotatable inner wall of said particle collecting chamber, said shroud and rotor defining the inner and outer wall for the axial flow path through the particle separator stage;

annular seals in said inlet passageway coacting with said annular shroud to provide a particle seal for said collecting chamber wherein particles in said chamber are prevented from returning to said inlet passageway.

* * * * *